United States Patent Office 3,847,896
Patented Nov. 12, 1974

3,847,896
ERYTHROMYCIN-2-THIOL ESTERS AND PROCESS
Anthony A. Sinkula, Kalamazoo, Mich., assignor to The
Upjohn Company, Kalamazoo, Mich.
No Drawing. Filed Apr. 9 1973, Ser. No. 349,373
Int. Cl. C07c 129/18
U.S. Cl. 260—210 E          21 Claims

ABSTRACT OF THE DISCLOSURE

Novel erythromycin-2'-thiol esters are disclosed and the process of their preparation. Disclosed also are therapeutic compositions containing erythromycin-2'-thiol esters as the active ingredient. The compounds of the invention are useful antibacterial agents, and are of particular value for preparing oral pharmaceutical forms of erythromycins since they possess improved taste properties.

BACKGROUND OF THE INVENTION

1. Field of the Invention

The invention concerns novel derivatives of erythromycin A, and more particularly concerns erthromycin-2'-thiol esters, their preparation and use as antibacterial agents.

2. Description of the Prior Art

Erythromycin is a well known antibacterial compound; see for example U.S. Pats. 2,823,203 and 2,833,696. The 2'-hemiester derivatives of erythromycin have also been described (see U.S. Pats. 2,857,312 and 2,957,864).

The conversion of erythromycin-2'-hemiesters to corresponding 2'-ureides has been disclosed in U.S. Pat. 3,661,891. Preparation of the corresponding 2'-amides is disclosed in U.S. Pats. 3,597,415 and 3,689,645.

All of the prior known erythromycin derivatives have characteristic bitter tastes. Although some of the 2'-substituted analogs possess improved palatability over the parent erythromycin, they still present problems to the pharmacist in masking the taste for oral medications formulated with them as an active ingredient. This is particularly so in formulating pediatric oral liquids, which are limited, for example, in flavors available. Unexpectedly, the erythromycin-2'-thiol esters of my invention are tasteless. They are therefore advantageously employed in a broader range of oral formulations than was heretofore possible and may be flavored to meet any taste.

The compounds of the invention also compare very favorably with erythromycin in regard to blood serum levels achieved in animals when administered orally.

SUMMARY OF THE INVENTION

The invention comprises compounds of formula:

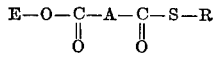

and the pharmaceutically acceptable acid addition salts thereof wherein A is selected from alkylene and alkenylene having in each instance from 2 to 4 carbon atoms, inclusive; R is hydrocarbyl and E represents the monovalent moiety of formula:

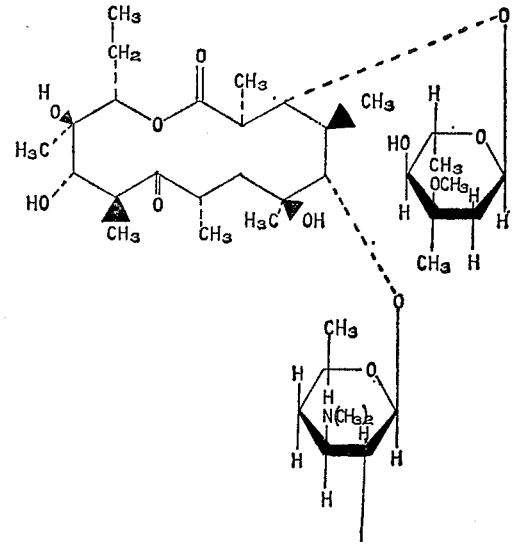

The broken lines in the formula (II) are employed in their conventional sense to indicate the position of the substituent groups as being below the plane of the ring structure. Those substituent groups located above the plane of the ring are so indicated by the conventionally used dark wedge.

The term "alkylene" is employed in its usual sense as meaning the divalent moiety obtained upon removal of two hydrogen atoms from a saturated aliphatic hydrocarbon of the stated carbon content. The moiety may be linear or branched, provided there are at least 2 carbon atoms separating the valencies. Illustrative of alkylene are ethylene, 1,2-propylene, 1,3-propylene, 1,2-butylene, 2,3-butylene and the like.

The term "alkylene" is used herein as meaning the divalent moiety obtained upon removal of two hydrogen atoms from an unsaturated aliphatic hydrocarbon having the stated carbon content. The moiety may be linear or branched provided there are at least 2 carbon atoms seperating the valencies. Illustrative of alkenylene are vinyl, allyl, 1-butenylene, and the like.

The term "hydrocarbyl" as used throughout the specification and claims means the monovalent moiety obtained upon removal of a hydrogen atom from a parent hydrocarbon such as a hydrocarbon having from 1 to 18 carbon atoms, inclusive.

Illustrative of hydrocarbyl are alkyl of from 1 to 18 carbon atoms, inclusive, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl and the isomeric forms thereof; cycloalkyl such as cyclopropyl, cyclobutyl, cyclopentyl, cyclohexyl, cyclohexylmethyl, cycloheptyl, cyclooctyl, 2-methylcyclopentyl, 2,3-dimethylcyclobutyl, 4-methylcyclobutyl, 3-cyclopentylpropyl, and the like; polycycloalkyl such as adamantyl and the like; aralkyl such as benzyl, phenethyl, α-phenylpropyl, phenylhexyl, phenyldodecyl, α-naphthylmethyl, and the like; alkenyl such as ethenyl, propenyl, butenyl, pentenyl, hexenyl, heptenyl, octanyl, nonenyl, decenyl, undecenyl, dodecenyl, tridecenyl, tetradecenyl, pentadecenyl, hexadecenyl, heptadecenyl, octadecenyl, and isomeric forms thereof; cycloalkenyl such as cyclobutenyl, cyclopentenyl, cyclohexenyl and the like; aryl of 6 to 18 carbon atoms, inclusive, such as phenyl, o-, m- and p-tolyl, ethylphenyl, xylyl, naphthyl, diphenylyl, anthracyl, dipropylphenylyl and the like.

The compounds (I) of the invention are erythromycin-2'-thiol esters useful as antibacterial agents in the same manner, for example, as erythromycin (see U.S. Patent 2,957,864) and the erythromycin amides (see U.S. Patent 3,597,415).

Preferred as antibacterial agents are those compounds (1) wherein R specifically represents alkyl of from 1 to 18 carbon atoms, inclusive, and particularly preferred for the high blood levels obtained are those wherein R is alkyl of at least 6 carbon atoms.

DETAILED DESCRIPTION OF THE INVENTION

The process of the invention whereby the compounds (1) are prepared is carried out by (1.) reacting the corresponding erythromycin hemiester compound of the formula:

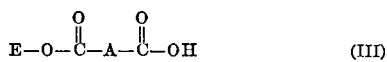

$$E-O-\overset{O}{\overset{\|}{C}}-A-\overset{O}{\overset{\|}{C}}-OH \qquad (III)$$

wherein E and A are as previously defined, with isobutylchloroformate at a temperature within the range of from about −25° C. to about 35° C.; and (2.) reacting the product so obtained with a thiol of the formula:

$$R-SH \qquad (IV)$$

wherein R has the meaning previously ascribed to it, at a temperature within the range of from about −25° C. to about 50° C., preferably between about −25° C. and 35° C. Most preferably both steps (1.) and (2.) above are carried out at a temperature of between −15° C. and room temperature (i.e., circa 25° C.).

In a preferred embodiment of the process of the invention, the step (1.) above; that is the reaction of the compound (III) with isobutylchloroformate is carried out at an initial temperature of from about −25° C. to about −15° C. Within about 1 hour after the reactions are admixed, the reaction mixture is then warmed to less than 35° C., preferably to room temperature (i.e., circa 25° C.). In another preferred embodiment, step (2.) (the reaction with thiol compound IV) is carried out at an initial temperature of between about −25° C. and about −15° C. After the reactants are admixed, the reaction mixture is warmed to less than 35° C., preferably to room temperature. The preferred embodiments of the process of the invention result in the most advantageous product yield.

In the step (1.) comprising the reaction of compound (III) with isobutylchloroformate, a by-product of the reaction is hydrochloric acid. It is preferred that the acid be removed from the reaction mixture as it forms. The removal of acid may be carried out by conventional methods, for example, by reacting it with an acid acceptor compound. The technique is well known as are acid acceptor compounds such as the tertiary amines. Illustrative of acid acceptor tertiary amines are trimethylamine, triethylamine, tripropylamine, tributylamine, tripentylamine, trihexylamine, pyridine and the like.

The proportions of reactants employed in the process of the reaction are not critical. In general, substantially equimolar proportions are employed. Advantageously, at least a molar excess of isobutylchloroformate is employed, preferably a 2 to 4 molar excess. It is also preferred to employ the thiol compound (IV) in a molar excess proportion, i.e.: a molar excess over the proportion of reactant compound (III). Most preferably, thiol compound (IV) is employed in a 2 to 4 molar excess.

Advantageously the process of the invention is carried out in the presence of an inert organic solvent for the starting compounds (III). By the term "inert organic solvent" I mean an organic solvent which does not enter reaction with other components of the reaction mixtures and does not alter the desired course of the reactions occurring. Illustrative of inert organic solvents are acetone, ether, chloroform, methylene chloride, acetonitrile, tetrahydrofuran, dimethyl sulfoxide, dioxane or mixtures thereof.

Admixture of reactants and other reaction mixture components are carried out employing conventional techniques and apparatus. Each reaction step in the process results in a slight exotherm, which is readily controlled by conventional methods of maintaining the desired reaction mixture temperatures, such as by gradual admixture of reactants and/or cooling of the reaction mixture.

The completion of each reaction step in the process of the invention may be ascertained by conventional methods of analysis. For example, by thin-layer chromatography the disappearance of starting compounds and appearance of product compounds may be ascertained.

The starting compounds (III) employed as reactants in the process of the invention are well known erythromycin hemiesters; see for example U.S. Pats. 2,857,312, 2,957,864 and 3,597,415.

Thiol reactants (IV) are also generally well known as is their preparation. Illustrative of thiols (IV) are methanethiol, ethanethiol, 1-propanethiol, 2-propanethiol, 1-butanethiol, 2-methyl - 1 - propanethiol, 1-pentanethiol, 2-pentanethiol, 1-hexanethiol, 1-heptanethiol, 1-octanethiol, 2,6 - dimethyl - 3 - octanethiol, 7,7-dimethyl-1-octanethiol, 1-nonamethiol, 1-decanethiol, 1-undecanethiol, 1-dodecanethiol, 1 - hexadecanethiol, 1-octadecanethiol, cyclobutanethiol, cyclohexanethiol, 1 - adamentanethiol, 3,5,7 - trimethyladamantane - 1 - thiol, 2-adamantanethiol, α-toluenethiol, β-phenylethyl mercaptan, 2 - propene - 2 - thiol, 1-butene-2-thiol, 5,5,7,7-tetramethyl-2-octene-1-thiol, 9-octadecene - 1 - thiol, 2-cyclohexene-1-thiol; benzenethiol, o-, m- and p-toluenethiol, α-naphthalenethiol, 4-mercaptophenyl, 2-anthracenethiol, 2-phenanthrenethiol, 3-phenanthrenethiol and the like thiols having the formula (IV).

The compositions of the present invention are preferably presented for administration to animals, including humans, in unit dosage forms, such as tablets, capsules, powders, granules, sterile parenteral suspensions and oral solutions or suspensions containing effective amounts of compound (1) or their acid addition salts as the principal active ingredient.

For oral administration either solid fluid unit dosage forms may be prepared. For preparing solid compositions such as tablets, the principal active ingredient is mixed with conventional ingredients such as talc, magnesium stearate, dicalcium phosphate, magnesium aluminum silicate, starch, lactose, acacia, methylcellulose, and functionally similar materials as pharmaceutical diluents or carriers. In their simplest embodiment, capsules, like tablets, are prepared by mixing the active ingredient with an inert pharmaceutical diluent and filling the mixture into a hard gelatin capsule of appropriate size. Soft gelatin capsules are prepared by machine encapsulation of a slurry of the active ingredient with corn oil, light liquid petrolatum or other inert oil.

Fluid unit dosage forms for oral administration such as syrups, elixirs, and suspensions may be prepared. The water-soluble forms may be dissolved in an aqueous vehicle together with sugar, aromatic flavoring agents and preservatives to form a syrup. An elixir is prepared by using a hydro-alcoholic (ethanol) vehicle with suitable sweeteners such as sugar, saccharin, and cyclamate together with an aromatic flavoring agent. Suspensions may be prepared of the insoluble forms with a syrup vehicle employing the aid of a suspending agent such as acacia, tragacanth, methylcellulose and the like.

Topical ointments may be prepared by dispersing the active ingredient in a suitable ointment base such as petrolatum, lanolin, polyethylene glycols, mixtures thereof, and the like. Advantageously, the antibiotic is finely divided by means of a colloid mill, utilizing light liquid petrolatum as a levigating agent prior to dispersing in the ointment base. Topical creams and lotions are prepared by dispersing the active ingredient in the oil phase prior to the emulsification of the oil phase in water.

For parenteral administration, fluid unit dosage forms are prepared utilizing the active ingredient and a sterile vehicle, water being preferred. The active ingredient, depending on the form and concentration used, is either suspended or dissolved in the vehicle. In preparing solutions the water-soluble active ingredient may be dissolved in water for injection and filter sterilized before filling into a suitable vial or ampule and sealing. Advantageously, adjuvants such as a local anesthetic, preservative and buffering agents are dissolved in the vehicle. To enhance the stability, the composition may be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the active ingredient is suspended in the vehicle instead of being dissolved and sterilization cannot be accomplished by filtration. The active ingredient may be sterilized by exposure to ethylene oxide before suspending in the sterile vehicle. Advantageously, a surfactant or wetting agent is included in the composition to facilitate uniform distribution of the active ingredient.

The term unit dosage form as used in the specification and claims refers to physically discrete units suitable as unitary dosages for human subjects and animals, each unit containing a predetermined quantity of active material calculated to produce the desired therapeutic effect, i.e., an effective amount, in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification. Examples of unit dosage forms in accord with this invention are tablets, capsules, troches, suppositories, powder packets, granules, wafers, cachets, teaspoonfuls, tablespoonfuls, dropperfuls, ampuls, vials, segregated multiples of any of the foregoing, and other forms as herein described.

The dosage of compounds (I) for treatment depends on the route of administration; the age, weight, and condition of the patient; and the particular disease to be treated. For adults, a dosage schedule of from about 250 to 1000 mg., represented as erythromycin base, 4 times daily (every six hours), embraces the effective range for the treatment of most conditions. For infants the dosage is calculated on the basis of 40 mg./kg. per day by weight in 3 or 4 divided doses represented as erythromycin base, and for children 30 to 50 mg./kg. per day represented as erythromycin base.

The compounds (I) are compounded with a suitable pharmaceutical carrier in unit dosage form for convenient and effective administration. In the preferred embodiments of this invention, the dosage units contain compounds (I) in 25, 50, 125, and 250 mg. amounts represented as erythromycin base for systemic treatment; in 0.25, 0.5, 1.0 and 5.0% amounts represented as erythromycin base for topical or localized treatment; and 0.1 to 1.0% w./v. represented as erythromycin base for parenteral preparations. The dosage of compositions containing compounds (I) and one or more other active ingredients is to be determined with reference to the usual dosage of each such ingredient. A dose of from about 40 mg./kg./day represented as erythromycin base is preferred for systemic treatment.

The following examples describe the manner and process of making and using the invention and set forth the best mode contemplated by the inventor of carrying out the invention but are not to be construed as limiting. Minimum inhibitory concentrations (MIC) were determined by the method described in U.S. Pat. 3,597,415.

EXAMPLE 1

Erythromycin-2'-ethylthiol succinate

Erythromycin-2'-succinate hemiester (50.04 gm., 0.06 mole; prepared according to the method of U.S. Pat. 2,857,312, Example 1) is dissolved in 500 ml. of anhydrous acetone. 7.8 gm. (10.7 ml., 0.067 mole) of triethylamine is added to this solution and the mixture is cooled to $-10°$ C., then 9.15 gm. (8.7 ml., 0.067 mole) of i-butylchloroformate is added dropwise and the reaction mixture allowed to warm to room temperature. The mixture is then recooled to $-10°$ C. and 3.7 gm. (0.06 mole) of ethanethiol added. The resulting mixture is stirred at room temperature for about 12 hours and then the solvent is removed *in vacuo*. The residue (10 gms.) of white powder is dissolved in 250 ml. of acetonitrile and 75 gm. of silica gel GF (TLC grade) is added. The mixture is swirled and warmed to 50° C. The mixture is then filtered and the filtrate added to 1 liter of distilled water whereupon a precipitation of fine, white crystals occurs. The precipitate is separated by filtration and dried to give 13.61 gms. (20.8 percent of theory) of erythromycin-2'-ethylthiol succinate in the form of white crystals, M.P. 138–141° C. Identity of the product is confirmed by elemental analysis.

*Analysis.*—Calcd. for $C_{43}H_{75}NO_{15}S$ (percent): C, 58.81; H, 8.61, N, 1.59; S, 3.65; Eq. Wt., 878. Found: (percent; Corrected for 2.79% $H_2O$): C, 59.29; H, 8.45; N, 1.58; S, 3.31; Eq. Wt., 888.

Antibacterial Activity

| Organism: | Minimum Inhibitory Conc. (mcq./ml.) |
|---|---|
| S. aureus | 1.0 |
| S. hemolyticus | <0.5 |
| St. faecalis | 1.0 |
| E. coli | 31.2 |
| P. vulgaris | 125.0 |
| K. pneumoniae | 7.8 |
| Ps. aeruginosa | 31.2 |
| D. pneumoniae | <0.5 |

EXAMPLE 2

Erythromycin-2'-ethylthiol glutarate

Erythromycin-2'-glutarate hemiester (50.88 gm., 0.06 mole; method of *Example 6,* U.S. Patent 2,957,864) is dissolved in 500 ml. of anhydrous acetone. To this solution, 7.8 gm. (10.7 ml., 0.067 mole) of triethylamine is added dropwise with stirring. The resulting solution is then cooled to $-10°$ C. and 9.15 gm. (8.7 ml., 0.067 mole) of i-butylchloroformate is added dropwise over a period of about 5 minutes with vigorous stirring. The reaction mixture is then warmed to room temperature, recooled to $-10°$ C. and 3.7 gm. (0.06 mole) of ethanethiol added dropwise over a period of about 5 minutes. The reaction mixture is then stirred at room temperature for about four hours, recooled to $-25°$ C. and 0.3 ml. of ethanethiol added. The resulting mixture is stirred at room temperature for about 12 hours, cooled to $-25°$ C. and about 1000 ml. of water added to obtain a precipitate. The precipitate is separated by filtration and recrystallized six times from acetone-water (1:2, v./v.). The resulting crystals are dissolved in acetonitrile and slurried with 40 gms. of silica gel GF (TLC grade). The slurry mixture is filtered and water added to the filtrate to obtain a precipitate. Upon filtration and drying of the. precipitate there is obtained 11 gms. (18 percent of theory) of erythromycin-2′-ethylthiol glutarate in the form of white crystals, M.P. 128–132° C.

The identity of the product is confirmed by elemental analysis.

*Analysis.*—Calcd. for $C_{44}H_{77}NO_{15}S$ (percent): C, 59.24; H, 8.70; N, 1.57; S, 3.59; Eq. Wt., 892. Found (percent; Corrected for 1.92% $H_2O$): C, 60.09; H, 8.66; N, 1.33; S, 3.49; Eq. Wt., 909.

Antibacterial Activity

| Organism: | Minimum Inhibitory Conc. (mcq./ml.) |
|---|---|
| S. aureus | <0.5 |
| S. hemolyticus | <0.5 |
| St. faecalis | 4.0 |
| E. coli | 125.0 |
| P. vulgaris | 250.0 |
| K. pneumoniae | 15.6 |
| Ps. aeruginosa | 125.0 |
| D. pneumoniae | <0.5 |

EXAMPLE 3

Erythromycin-2′-hexylthiol succinate

Erythromycin-2′-succinate hemiester (50.04 gm., 0.06 mole prepared according to the method of *Example 1*, U.S. Pat. 2,857,312) is dissolved in 500 ml. of anhydrous acetone. 7.8 gm. (10.7 ml., 0.067 mole) of triethylamine is added to this solution and the mixture is cooled to −10° C. Then 9.15 gm. (8.7 ml., 0.067 mole) of i-butylchloroformate is added dropwise over a period of about 5 minutes. The resulting mixture is then warmed to room temperature. The mixture is then cooled to −10° C. and 7.1 gm. (0.06 mole) of hexanethiol added. The resulting mixture is stirred at room temperature for 48 hours, recooled to −10° C. and an additional 2 gm. of hexanethiol added. The mixture is stirred for about 12 hours and then solvent is evaporated. The residue powder is recrystallized from acetonitrile-water (1:1, v./v.) to obtain 10 gms. (20 percent of theory) of erythromycin-2′-hexylthiol succinate in the form of white crystals, M.P. 95–96° C.

Identity of the product structure is confirmed by elemental analysis.

*Analysis.*—Calcd. for $C_{47}H_{83}NO_{15}S$ (percent): C, 60.43; H, 8.96; N, 1.50; S, 3.43. Found (percent; Corrected for 0.89% $H_2O$): C, 60.10; H, 8.99; N, 1.49; S, 3.13.

EXAMPLE 4

Erythromycin-2′-hexylthiol glutarate

Erythromycin-2′-glutarate hemiester (50.88 gm., 0.06 mole; U.S. Pat. 2,957,864, supra.) is dissolved in 500 ml. of anhydrous acetone and 7.8 gm. (0.067 mole) of triethylamine is added to this solution. The resulting mixture is cooled to −10° C. and 9.15 gm. (8.7 ml., 0.067 mole) of i-butylchloroformate added dropwise. The reaction mixture is then warmed to room temperature and then recooled to −10° C. To the latter reaction mixture, 7.1 gm. (0.067 mole) of hexanethiol is added. The mixture is then stirred at room temperature for 48 hours, recooled to −10° C. and an additional 4 gm. of hexanethiol added. The resulting mixture is rewarmed to room temperature and stirred for about 12 hours, after which solvent is evaporated. Ten gm. of the residue is dissolved in a mixture of 3 gm. of TLC grade silica gel in 100 ml. of acetonitrile. The silica gel is then removed by filtration and the solvent removed *in vacuo*, to give 2 gm. (20 percent of theory) of erythromycin-2′-hexylthiol glutarate in the form of white crystals, M.P. 91–93° C.

Identity of the product is confirmed by elemental analysis.

*Analysis.*—Calcd. for $C_{48}H_{85}NO_{15}S$ (percent): C, 60.80; H, 9.04; N, 1.48; S, 3.38. Found (percent): C, 60.19; H, 8.96; N, 1.62; S, 3.46.

Similarly, following the above procedure but replacing the hexanethiol as used therein with an equal molar proportion of 1-octadecanethiol, cyclohexanethiol, α-toluenethiol, 9-octadecenethiol, benzenethiol and 1-adamantanethiol respectively, there is obtained erythromycin-2′-octadecylthiol glutarate, erythromycin-2′-cyclohexylthiol glutarate, erythromycin-2′-tolylthiol glutarate, erythromycin-2′-octadecylthiol glutarate, erythromycin-2′-phenylthiol glutarate and erythromycin-2′-adamantylthiol glutarate respectively.

EXAMPLE 5

A series of 5 groups of mice are infected with *S. hemolyticus*. One group of the infected mice is treated by orally administering an aqueous suspension of erythromycin base. Each of the remaining groups is treated with a different compound of the formula (I) by an orally administered aqueous solution or suspension.

The results of treatment are expressed below in Table I as $CD_{50}$ [median protective dose; Spearman-Karber, "Statistical Methods in Biological Assay," 2d, ed., p. 524–530 (1964) Hafner Publishing Co., N.Y.].

TABLE I

| Group | Compound (I) | Oral $CD_{50}$ (mg./kg.)* | Ratio of activity to base to ester |
|---|---|---|---|
| 1 | Erythromycin-2′-ethylthiol succinate (Example 1, supra.). | 60(45–77) | 0.27 |
| 2 | Erythromycin-2′-ethylthiol glutarate (Example 2, supra.). | 36(27–47) | 0.44 |
| 3 | Erythromycin-2′-hexylthiol succinate (Example 3, supra.). | 40(29–56) | 0.42 |
| 4 | Erythromycin-2′-hexylthiol glutarate (Example 4, supra.). | 23(17–31) | 0.74 |
| 5 | Erythromycin base (control group) | 16(12–22) | 1.0 |

*Corrected to erythromycin base equivalent.

EXAMPLE 6

The blood levels of antibiotic obtained following oral administration of the erythromycin-2′-thiol compound (I) may be determined by the method of C. Lewis, K. F. Stern, and J. E. Grady, *Antimicrobial Agents and Chemotherapy*, (1964) p. 13.

To compare the absorption rates and blood levels obtained of erythromycin base with the erythromycin-2′-thiol esters (I), Sprague-Dawley (Upjohn strain), white, male rats weighing about 150 gm. are used. Rats are fasted 24 hours prior to use. The erythromycin-2′-thiol esters (I) are suspended in 0.25% methocel HG (Dow Chemical Co.) and administered orally by gavage in 0.5 ml. containing a dose of 100 mg./kg. as erythromycin base equivalent. At specified time intervals, free-flowing whole blood sufficient to saturate 6.35 mm. assay discs (Schleicher and Schnell Co., Keene, N.H.) are collected from the rat by clipping a portion of the tail. A modified assay method with the use of *Sarcina lutea* seeded agar in 20 x 50 cm. trays is used for all erythromycin assays. Such trays accommodate 90 discs, which enable the inhibition zones of the blood saturated discs to be compared with a common standard. Each tray contains a standard curve of 0.31, 0.62, 1.25, 2.5, 5.0 and 10.0 µg./ml. of erythromycin base. The free base has an assigned potency of 1000 µg./mg. All concentrations are calculated and reported as free base equivalents. The trays are refrigerated between bleedings and then incubated at 32° C. overnight.

Antibiotic blood concentrations are plotted on 1 x 1 inch graph paper (concentration in micrograms per milliliter, µg./ml., vs. time of bleeding). Areas under the curves are program-computed in concentration-time units by adding the trapezoidal areas with the aid of a computer, and the results are averaged. The area covered by erythromycin base is considered as one, and the areas under the erythromycin-2'-thiol ester (I) curves are expressed as the ratio to the free base. Specific compounds tested and the results thereof are given in Table II below. $T_{50}$=time for 50 percent of the area under the blood level curve to appear. $T_{max}$=time at which maximum blood concentration of drug is achieved. SE=standard error.

TABLE II

| Compound | Area under curve±SE* | $T^{50}$ of area ±SE | Max. conc. (mcg./ml.) | $T_{max}$. | Ratio, area/control |
|---|---|---|---|---|---|
| Erythromycin-2'-ethylthiol succinate | 52.9±7.6 | 298±33 | 0.13 | 300 | 0.460 |
| Erythromycin-2'-ethylthiol glutarate | 80±20 | 22±60 | 0.41 | 120 | 0.698 |
| Erythromycin base (control) | 115±33 | 193±17 | 0.55 | 210 | 1.000 |

*Mean area from three rats.

Similarly, following the above procedure, the relative blood level obtained following oral administration of erythromycin-2'-hexylthiol succinate and erythromycin-2'-hexylthiol glutarate respectively are found to be as shown in Table III, below.

TABLE III

| Compound | Area under curve±SE* | $T^{50}$ of area ±SE | Max. conc. (mcg./ml.) | $T_{max}$. | Ratio, area/control |
|---|---|---|---|---|---|
| Erythromycin-2'-hexylthiol succinate | 69±17 | 102±9 | 0.45 | 30 | 1.033 |
| Erythromycin-2'-hexylthiol glutarate | 144±25 | 155±3 | 0.61 | 45 | 2.155 |
| Erythromycin base (control) | 67±10 | 138±9 | 0.40 | 90 | 1.000 |

*Mean area of three rats.

EXAMPLE 7

Capsules

One thousand two-piece hard gelatin capsules for oral use, each containing 125 mg. of erythromycin-2'-ethylthiol succinate as the active ingredient, (Example 1, supra) are prepared from the following types and amounts of materials:

| | Gm. |
|---|---|
| Erythromycin-2'-ethylthio succinate | 125 |
| Corn starch | 150 |
| Talc | 75 |
| Magnesium stearate | 25 |

The materials are thoroughly mixed and then encapsulated in the usual manner.

The foregoing capsules are useful for the systemic treatment of infection in adult humans by the oral administration of 1 capsule every 4 hours.

Using the procedure above, capsules are similarly prepared containing the antibiotic in 250 mg. and 500 mg. amounts by substituting 250 gms. and 500 gms. of active ingredient for the 125 gms. used above.

EXAMPLE 8

Tablets

One thousand tablets for oral use, each containing 250 mg. of erythromycin-2'-ethylthiol glutarate (Example 2, supra) as active ingredient, are prepared from the following types and amounts of materials:

| | Gm. |
|---|---|
| Erythromycin-2'-ethylthiol glutarate | 250 |
| Lactose | 125 |
| Corn starch | 65 |
| Magnesium stearate | 25 |
| Light liquid petrolatum | 3 |

The ingredients are thoroughly mixed and slugged. The slugs are broken down by forcing through a number sixteen screen. The resulting granules are then compressed into tablets, each tablet containing 250 mg. of active ingredient.

The foregoing tablets are useful for systemic treatment of infections in adult humans by oral administration of 1 tablet every 4 hours.

EXAMPLE 9

Tablets

One thousand oral tablets, each containing 50 mg. of erythromycin-2'-hexylthiol succinate (Example 3, supra.) and a total of 250 mg. (83.3 mg. each) of sulfadiazine, sulfamerizine, and sulfamethazine, are prepared from the following types and amounts of materials:

| | Gm. |
|---|---|
| Erythromycin-2'-hexylthiol succinate | 50 |
| Sulfadiazine | 83.3 |
| Sulfamerazine | 83.3 |
| Sulfamethazine | 83.3 |
| Lactose | 50 |
| Corn starch | 50 |
| Calcium stearate | 25 |
| Light liquid petrolatum | 5 |

The ingredients are thoroughly mixed and slugged. The slugs are broken down by forcing through a number sixteen screen. The resulting granules are then compressed into tablets, each containing 50 mg. of erythromycin ester ingredient and a total of 250 mg. (83.3 mg. each) of sulfadiazine, sulfamerizine, and sulfamethazine.

The foregoing tablets are useful for systemic treatment of infections by the oral administration of 4 tablets first and then 1 every six hours.

For the treatment of urinary infections, the triple sulfas in the above formulation is advantageously replaced by 250 g. of sulfamethylthiadiazole or 250 g. of sulfacetamide.

EXAMPLE 10

Granules 2367 gms. of a granulation suitable for reconstitution with water prior to use is prepared from the following types and amounts of ingredients:

| | Gm. |
|---|---|
| Erythromycin-2'-hexylthiol succinate | 150 |
| Sucrose, powdered | 2155 |
| Flavor | 60 |
| Sodium metabisulfite | 2 |

The erythromycin sugar, flavor, and sodium metabisulfite are mixed together until thoroughly blended. The powder mixture is wetted with water and forced through a screen to form granules. The graules are dried and 23.67 g. filled into 60 cc. bottles. Prior to use sufficient water is added to the granules to make 60 cc. of composition.

The foregoing composition is useful for systemic treatment of infection, particularly in chlidren at a dose of one teaspoonful (5 cc.) 4 times daily.

EXAMPLE 11

Oral Syrup 1000 cc. of an aqueous preparation for oral use, containing in each 5 cc. dose, 0.15 g. of erythromycin-2'-hexylthiol succinate as the active ingredient is prepared from the following types and amounts of ingredients:

| | Gm. |
|---|---|
| Erythromycin-2'-hexylthiol succinate | 30 |
| Citric acid | 2 |
| Benzoic acid | 1 |
| Sucrose | 700 |
| Tragacanth | 5 |
| Lemon oil | 2 |
| Deionized water q.s. 1000 cc. | |

The citric acid, benzoic acid, sucrose, tragacanth, and lemon oil are dispersed in sufficient water to make 850 cc. of solution. The active ingredient is stirred into the syrup until uniformly distributed. Sufficient water is added to make 1000 cc.

The composition so prepared is useful in the systemic treatment of infection in adult humans at a dose of 1 or 2 teaspoonfuls 4 times a day.

EXAMPLE 12

Parenteral Suspension

A sterile aqueous suspension for intramuscular use, containing in 1 cc., 100 mg. of erythromycin-2'-ethylthiol succinate is prepared from the following types and amounts of materials:

| | Gm. |
|---|---|
| Erythromycin-2'-ethylthiol succinate | 100 |
| Lidocaine hydrochloride | 4 |
| Methylparaben | 2.5 |
| Propylparaben | 0.17 |
| Water for injection q.s. | 1000 |

All of the ingredients, except the active ingredient, are dissolved in the water and the solution sterilized by filtration. To the sterile solution is added the sterilized active ingredient and the final suspension is filled into sterile vials and the vials sealed.

EXAMPLE 13

Topical Ointment 1000 gms. of 2 percent ointment is prepared from the following types and amounts of ingredients:

| | Gm. |
|---|---|
| Erythromycin-2'-hexylthiol succinate (Example 3, supra) | 20 |
| Zinc oxide | 50 |
| Calamine | 50 |
| Liquid petroleum (heavy) | 250 |
| Wool fat | 200 |
| White petrolatum q.s. | 1000 |

The white petrolatum and wool fat are melted and 100 g. of liquid petrolatum added thereto. The active ingredient, zinc oxide and calamine are added to the remaining liquid petrolatum and the mixture milled until the powders are finely divided and uniformly dispersed. The powder mixture is stirred into the white petrolatum mixture and stirring continued until the ointment congeals.

The foregoing ointment is usefully applied topically to the skin of mammals for the treatment of infection.

The foregoing composition may be prepared by omitting the zinc oxide and calamine.

Following the procedure above, ointments, are similarly prepared containing the erythromycin-2'-hexylthiol succinate in 0.5%, 1% and 5% proportions by weight, substituting 5 gm., 10 gms., and 50 gms. of active ingredient for the 20 gms. used above.

EXAMPLE 14

Troches 10,000 Troches are prepared from the following types and amounts of ingredients:

| | Gm. |
|---|---|
| Erythromycin-2'-ethylthiol succinate (Example 1., supra) | 500 |
| Neomycin sulfate | 50 |
| Polymyxin B sulfate (10,000 units/mg.) | 1 |
| Ethyl aminobenzoate | 50 |
| Calcium stearate | 150 |
| Powdered sucrose q.s. | 5000 |

The powdered materials are mixed thoroughly and then compressed into half gram troches following the usual techniques for the preparation of compressed tablets.

The troches are held in the mouth and allowed to dissolve slowly to provide treatment for the mouth and throat of humans.

EXAMPLE 15

Mastitis Ointment 1000 gms. of an ointment for the treatment of mastitis in dairy cattle is prepared from the following types and amounts of ingredients:

| | Gm. |
|---|---|
| Erythromycin-2'-hexylthiol succinate | 250 |
| Prednisolone acetate | 0.5 |
| Light liquid petrolatum | 300 |
| Chlorobutanol, anhydrous | 5 |
| Polysorbate 80 | 5 |
| 2% aluminum monostearate-peanut oil gel | 400 |
| White petrolatum q.s. | 1000 |

The erythromycin active ingredient and prednisolone acetate are milled with the light liquid petrolatum until finely divided and uniformly dispersed. The chlorobutanol, polysorbate 80, peanut oil gel and white petrolatum are heated to 120° F. to form a melt and the liquid petrolatum dispersion stirred in. With continued stirring the dispersion is allowed to cool (and congeal) to room temperature and is filled into disposable mastitis syringes in 0.25 g. doses.

EXAMPLE 16

Animal Feed 1000 gm. of a feed mix is prepared from the following types and amounts of ingredients:

| | Gm. |
|---|---|
| Erythromycin-2'-hexylthiol succinate | 10 |
| Soybean meal | 400 |
| Fish meal | 400 |
| Wheat germ oil | 50 |
| Sorghum molasses | 140 |

The ingredients are mixed together and pressed into pellets.

The composition is palatable to animals and may be fed to laboratory animals, i.e., rats, mice, guinea pigs, and rabbits for prophylaxis against bacterial infection during shipping.

For larger animals, the composition may be added to the animal's regular feed in an amount calcuated to give the desired dose of compound (I).

EXAMPLE 17

Following the procedure of each of the preceding Examples 7 through 16, supra,. each member selected from the group consisting of erythromycin-2'-hexylthiol glutarate, erythromycin-2'-octadecylthiol glutarate, erythromycin-2'-cyclohexylthiol glutarate, erythromycin-2'-tolylthiol glutarate, erythromycin-2'-octadecylthiol glutarate, and erythromycin-2'-phenylthiol glutarate, respectively, all of which are prepared according to the procedure of *Example 4.*, supra.; are substituted in an equivalent amount for the particular form of erythromycin of Formula (I) shown in the example, to provide similar pharmaceutical comopsitions having similar therapeutic properties.

The compounds (I) of the invention are free base compounds, which are readily converted to the corresponding acid addition salts by conventional and known methods. For example, the free base may be neutralized with an appropriate acid to below about pH 7.5, and advantageously to about pH 2 to pH 6. Salts which are so made are illustrated as follows: (1) akyl carboxylate salts,

where $X=C_1$ to $C_{17}$; (2) alkyl sulfate salts, $XSO_3^\ominus$ where $X=C_1$ to $C_{18}$, for example, laurylsulfate; (3) aromatic carboxylate salts, for example benzoate, salicylate, o-benzoylbenzoate, 5,5'-methylenebissalicylate, and 5-phenylsalicylate; (4) aliphatic dicarboxylate salts, for example, malonate, succinate, $\alpha,\beta$-dibromosuccinate tartrate, maleate, sebacate, adipate, and malate; (5) inorganic acid salts, for example, hydrochloride, sulfate, phosphate, and hydrobromide; and (6) other acid addition salts, for example, glutamate, glucoheptanoate, gluconate, lactobionate, citrate, mandelate, phenylbutyrate, $\alpha$-ethyl-$\gamma$-phenylbutyrate, $\alpha$-benzamido-$\beta$-benzylmercaptobutyrate, N-(4'-nitrobenzoyl) glutamate, 4-phenylbenzylate, cyclohexanepropionate, $\alpha$-(4-xenyl)phenylacetate, fencholate, monobenzyl, succinate, 4-phenyl benzoate, 4(4'-phenylazo) benzoate, 2,4,6-trimethylbenzoate, 4(4'-tosylamido)benzoate, 2,6-dimethyl-4-carbamylbenzoate, 2,6 - dimethyl-4-acetamidobenzoate, 2,3,5,6 - tetramethylbenzoate, $\alpha$ - naphthoate, monobutylphthalate, 4-(4'-nitrophenyl) benzoate, 4-cyclohexyloxybenzoate, veratrate, naphthalate, isophthalate, benzophenone-2,4-dicarboxylate mono salt, benzophenone-2,4-dicarboxylate di salt, 1,1'-binaphthalene-8,8'-dicarboxylate mono salt and di salt, $\beta$-resorcylate, gentisate, 5-bromosalicylate, 4-aminosalicylate, 3-phenylsalicylate, 4-phenylsalicylate, 4-phenylgentisate, 5-nitro-3-phenylsalicylate, pamoate, syringate, vanillate, thiosalicylate, cinnamate, $\alpha$-benzamido cinnamate, 4-nitrocinnamate, 3,4-methylenedioxycinnamate, 2-methoxycinnamate, $\alpha$-ethylcinnamate, tannate, 3-indoleacetate, and 2-indolecarboxylate.

Salts of the compounds of formula (I) may be used for the same purposes as the corresponding free base (I). The pharmaceutically acceptable acid addition salts of the compounds of formula (I), for example the hydrochloride, phosphates and sulfates are particularly useful for aqueous and parenteral pharmaceutical formulations, for the treatment of bacterial infections in animals.

What is claimed is:

1. A compound selected from those of formula:

and the pharmaceutically acceptable acid addition salts thereof wherein A is selected from alkylene and alkenylene having in each instance from 2 to 4 carbon atoms, inclusive; R is hydrocarbyl and E represents the monovalent moiety of formula:

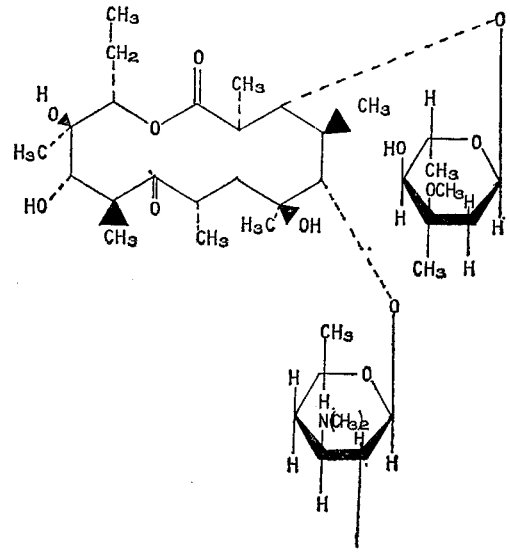

2. A compound according to claim 1 wherein R is alkyl of from 1 to 18 carbon atoms, inclusive.
3. A compound according to claim 1 which is erythromycin-2'-ethylthiol succinate.
4. A compound according to claim 1 which is erythromycin-2'-ethylthiol glutarate.
5. A compound according to claim 1 which is erythromycin-2'-hexylthiol succinate.
6. A compound according to claim 1 which is erythromycin-2'-hexylthiol glutarate.
7. A process for preparing compounds of the formula:

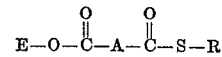

wherein A is selected from alkylene and alkenylene having in each instance from 2 to 4 carbon atoms, inclusive; R is hydrocarbyl and E represents the monovalent moiety of formula:

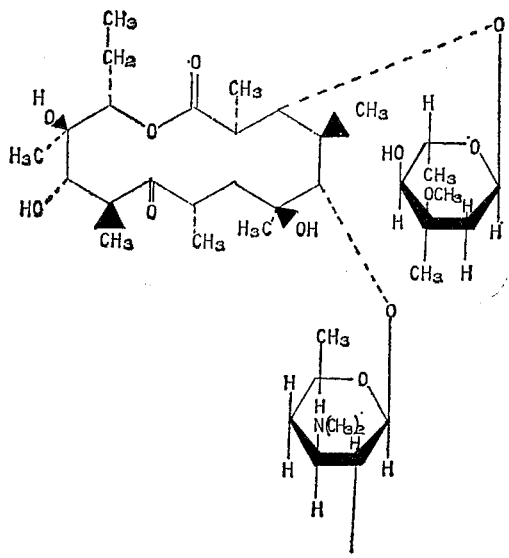

which consists essentially of:
(1) reacting the corresponding erythromycin hemiester compound of formula:

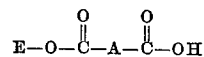

R is hydrocarbyl and E represents the monovalent moiety of formula:

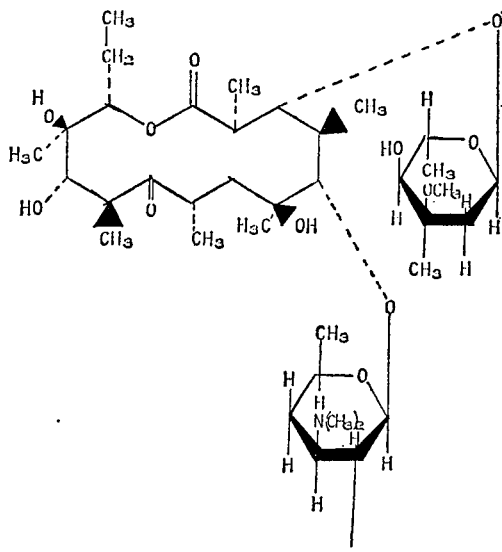

which consists essentially of:
(1) reacting the corresponding erythromycin hemiester compound of formula:

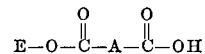

wherein E and A are as defined above, with isobutylchloroformate at an initial temperature of from −25° C. to −15° C. and then at a temperature of from −15° C. to less than 35° C.; and (2) reacting the reaction product of step (1) with a thiol of the formula:

R—SH wherein R is as defined above, at an initial temperature of from about −25° C. to about −15° C. and then at a temperature of from about −15° C. to less than about 50° C.; said steps (1) and (2) being carried out in the presence of an inert organic solvent and an acid acceptor compound.

References Cited
UNITED STATES PATENTS
3,726,856  4/1973  Sinkula _____ 260—210 E JOHNNIE R. BROWN, Primary Examiner
C. B. OWENS, Assistant Examiner U.S. Cl. X.R.
424—182 wherein E and A are as defined above, with isobutylchloroformate at a temperature within the range of from −25° C. to 35° C.; and
(2) reacting the reaction product of step (1) with a thiol of the formula:

R—SH wherein R is as defined above, at a temperature within the range of from −25° C. to 50° C.

8. A process according to claim 7 wherein step (1) is carried out at a temperature of between −15° C. and room temperature.

9. A process according to claim 7 wherein step (2) is carried out at a temperature of between −15° C. and room temperature.

10. A process according to claim 7 wherein steps (1) and (2) are carried out at a temperature of between −15° C. and room temperature.

11. A process according to claim 7 wherein in step (1) hydrochloric acid by-product is removed as it forms in the reaction mixture.

12. A process according to claim 7 wherein step (1) is carried out in the presence of an acid acceptor compound.

13. A process according to claim 7 carried out in the presence of an inert organic solvent.

14. A process according to claim 7 wherein the proportion of thiol is such that it is a molar excess over the proportion of erythromycin hemiester compound.

15. A process according to claim 7 wherein the proportion of isobutylchloroformate is a molar excess over the proportion of erythromycin hemiester.

16. A process according to claim 7 wherein R is alkyl of from 1 to 18 carbon atoms, inclusive.

17. A process according to claim 7 wherein erythromycin-2'-succinate hemiester is reacted with isobutylchloroformate in step (1) and the product thereof is reacted with ethanethiol to obtain erythromycin-2'-ethylthiol succinate.

18. A process according to claim 7 wherein erythromycin-2'-glutarate hemiester is reacted with isobutylchloroformate in step (1) and the product thereof is reacted with ethanethiol to obtain erythromycin-2'-ethylthiol glutarate.

19. A process according to claim 7 wherein erythromycin-2'-succinate hemiester is reacted with isobutylchloroformate in step (1) and the product thereof is reacted with hexanethiol to obtain erythromycin-2'-hexylthiol succinate.

20. A process according to claim 7 wherein erythromycin-2'-glutarate hemiester is reacted with isobutylchloroformate in step (1) and the product thereof is reacted with hexanethiol to obtain erythromycin-2'-hexylthiol glutarate.

21. A process for preparing compounds of the formula:

wherein A is selected from alkylene and alkenylene having in each instance from 2 to 4 carbon atoms, inclusive;

UNITED STATES PATENT OFFICE
CERTIFICATE OF CORRECTION

Patent No. 3,847,896            Dated November 12, 1974

Inventor(s)   Anthony A. Sinkula

It is certified that error appears in the above-identified patent and that said Letters Patent are hereby corrected as shown below:

Column 2, line 40, "'alkylene'" should read --"alkenylene"--; line 64, "octanyl" should read --octenyl--. Column 3, line 46, "reactions" should read --reactants--. Column 4, line 35, "nonamethiol" should read --nonanethiol--; line 37, "adamentane-thiol" should read --adamantanethiol--; line 43, "mercaptophenyl" should read --mercaptobiphenyl--; line 54, "solid fluid" should read --solid or fluid--. Column 6, line 44, "(mcq./ml.)" should read --(mcg./ml.)--. Column 7, line 15, "(mcq./ml.)" should read --(mcg./ml.)--.

Signed and sealed this 15th day of April 1975.

(SEAL)
Attest:

RUTH C. MASON
Attesting Officer

C. MARSHALL DANN
Commissioner of Patents
and Trademarks